United States Patent
Zhong et al.

(10) Patent No.: US 12,145,316 B1
(45) Date of Patent: Nov. 19, 2024

(54) CORONA DISCHARGE DIRECTED 3D STRUCTURE CONSTRUCTION

(71) Applicant: University of South Florida, Tampa, FL (US)

(72) Inventors: Ying Zhong, Tampa, FL (US); Zijian Weng, Temple Terrace, FL (US)

(73) Assignee: University of South Florida, Tampa, FL (US)

( * ) Notice: Subject to any disclaimer, the term of this patent is extended or adjusted under 35 U.S.C. 154(b) by 129 days.

(21) Appl. No.: 18/121,054

(22) Filed: Mar. 14, 2023

(51) Int. Cl.
| | |
|---|---|
| *B29C 64/268* | (2017.01) |
| *B29C 64/153* | (2017.01) |
| *B29C 64/264* | (2017.01) |
| *B29C 64/386* | (2017.01) |
| *B29C 64/393* | (2017.01) |
| *B33Y 10/00* | (2015.01) |
| *B33Y 30/00* | (2015.01) |
| *B33Y 50/00* | (2015.01) |
| *B33Y 50/02* | (2015.01) |
| *H05H 1/24* | (2006.01) |
| *H05H 1/46* | (2006.01) |

(52) U.S. Cl.
CPC .......... *B29C 64/264* (2017.08); *B29C 64/153* (2017.08); *B33Y 10/00* (2014.12); *B33Y 30/00* (2014.12); *H05H 1/47* (2021.05)

(58) Field of Classification Search
CPC ... B29C 64/153; B29C 64/268; B29C 64/386; B29C 64/393; B33Y 10/00; B33Y 30/00; B33Y 50/00; B33Y 50/02; H05H 1/24; H05H 1/46; H05H 1/47
USPC ............... 264/438, 439, 460, 463, 483, 497; 425/135, 174, 174.4, 375; 219/121.36, 219/121.54, 121.59, 121.6, 121.85
See application file for complete search history.

(56) References Cited

U.S. PATENT DOCUMENTS

| | | | |
|---|---|---|---|
| 2010/0163405 A1* | 7/2010 | Ackelid | B29C 64/268 425/174.4 X |
| 2020/0157690 A1* | 5/2020 | Shinoda | C23C 4/01 |

FOREIGN PATENT DOCUMENTS

| | | | | |
|---|---|---|---|---|
| JP | 2001210494 A | * | 8/2001 | H05H 1/46 |

OTHER PUBLICATIONS

Translation of JP 2001210494 A (published on Aug. 3, 2001).*

* cited by examiner

*Primary Examiner* — Leo B Tentoni
(74) *Attorney, Agent, or Firm* — Anton J. Hopen; Smith & Hopen, P. A.

(57) ABSTRACT

This invention relates to a method and apparatus for creating a three-dimensional structure from a binder-free powder. A corona discharge (plasma) generator forms a controllable electric field, positioning the binder-free powder within the influence of the electric field generated by the corona discharge generator, and activating the corona discharge generator to attract the binder-free powder into a three-dimensional structure. The corona discharge generator includes a grounded bottom substrate and a top substrate elevated above the bottom substrate in a substantially parallel planar orientation. The binder-free powder is placed in the interstitial space between the bottom substrate and the top substrate. An electrode above the top substrate, in electrical communication with the bottom substrate and coupled to a voltage power supply, creates the electrical field. The resulting three-dimensional structure is formed far more rapidly than known additive manufacturing techniques.

18 Claims, 14 Drawing Sheets

CORONA DISCHARGE DIRECTED 3D STRUCTURE CONSTRUCTION

GOVERNMENT INTEREST

This invention was made with Government support under Grant No. 2114216 awarded by the National Science Foundation. The Government has certain rights in the invention.

BACKGROUND OF THE INVENTION

1. Field of the Invention

The described embodiments relate generally to additive manufacturing. Specifically, the described embodiments relate to systems and methods for additive manufacturing using non-contact corona discharge.

2. Brief Description of the Related Art 3D printing, also known as additive manufacturing, is a widespread method for producing 3D structures and devices globally. It boasts benefits such as efficient and speedy design and testing, cost-effectiveness, ease of access, limitless design possibilities, and minimal waste and risk. The American Society for Testing and Materials (ASTM)/F2921 classifies seven additive manufacturing techniques including material extrusion, binder jetting, material jetting, powder bed fusion, directed energy deposition, sheet lamination, and vat photopolymerization. The most used 3D printing techniques, such as fused deposition modelling (FDM), selective laser sintering (SLS), and stereolithography (SLA), build 3D objects layer by layer. For example, SLS involves solidifying one layer, laying a layer of raw powder, and then solidifying the next layer. This process can take anywhere from several minutes to several hours, hindering mass production through 3D printing.

BRIEF SUMMARY OF THE INVENTION

To improve the efficiency of the additive manufacturing process, we introduce a corona discharge-enabled electrostatic 3D structure printing (CE-3DP) method. This approach harnesses the power of corona discharge to create an ultra-strong electric field that instantly forms the binder-free powders into a 3D structure in seconds or minutes. The subsequent overall or selective solidification results in a solid 3D object more efficiently than the traditional layer-by-layer method.

The invention relates to a method and apparatus for creating three-dimensional structures from binder-free powders. The method involves using a plasma generator (such as a corona discharge generator) that forms a controllable electric field to position the binder-free powder and activate the generator to attract the powder into a three-dimensional structure. The plasma generator includes a grounded bottom substrate and a top substrate elevated above the bottom substrate with an electrode in electrical communication with the bottom substrate. Top and bottom substrates (or elements) may incorporate various shapes including, but not limited to, plates, needles, wires, and spheres.

The voltage of the generator can be adjusted and the distance between the top and bottom substrate can also be adjusted. One exemplary voltage range is between ±100 V to ±60 kV. Distances between top and bottom substrates may be varied as the application calls for but exemplary ranges of 1.27 cm to 16.51 cm and 10 nm to 30 cm are disclosed.

The binder-free powder can be selected from a variety of materials including, but not limited to, cellulose acetate (CA), polyvinylpyrrolidone (PVP), polyvinyl fluoride (PVF), ethylene vinyl acetate (EVA), polylactic acid (PLA), and poly (ethylene glycol) (PEG), carbon fibers, polystyrene (PS), glucose, glass beads, and glass bubbles.

The top or bottom substrate may be patterned to control the shape and size of the structure. The top substrate or bottom substrate may be patterned with at least two distinct materials of different conductivity (e.g., silver and silicon) whereby it is possible to control the shape, size, and area of the structure by patterning the top or bottom substrates. The structure can be solidified through heat (e.g., ovens, infrared emitters, lasers, and microwaves) or adhesive (either before as a powder coating or after structure formation), and the bottom substrate can be controllably rotated during activation.

Like the methods describe, a corresponding apparatus for creating the structure includes a corona discharge generator and a container for the binder-free powder, as well as various controls for adjusting the voltage and patterning the substrates. The apparatus can also include the solidifying heat sources or a laser to sinter the structure. Embodiments of the invention anticipate laser selective sintering which may also solidify the structure as it is being formed.

BRIEF DESCRIPTION OF THE DRAWINGS

For a fuller understanding of the invention, reference should be made to the following detailed description, taken in connection with the accompanying drawings, in which:

FIG. 6 show images of stacked CA powders with different corona discharge polarities. FIGS. 6a-d are positive to negative; FIGS. 6e-h are from negative to positive.

FIG. 9b is a photographic image of the CE-3DP bridging process to form 3D structures with K1 glass beads with diameter of 65 μm.

FIG. 9c is a photographic image of the CE-3DP bridging process to form 3D structures with ethylene vinyl acetate (EVA) copolymer powders.

FIG. 9d is a photographic image of the CE-3DP bridging process to form 3D structures with polystyrene beads.

FIG. 9e-h are high-speed camera results on 65 μm glass beads.

FIG. 10c is a photographic image showing formed CE-3D structure with K1 glass beads with top substrate patterned as rendered in FIG. 10a.

DETAILED DESCRIPTION OF THE PREFERRED EMBODIMENT

Materials and Methods

The CE-3DP system is formed by a high voltage power supply (XP Power, FJ40R3, 120W, adjustable between 0 to ±40 kV), a tungsten discharge needle (tip diameter 100 μm), a grounded stainless steel ground substrate (mirror polished, 20 cm×20 cm×1 mm), and a top substrate made by polystyrene (PS), silicon wafer, or stainless steel (thickness 1 mm). The to-be printed materials are placed inside of a PS container between the top and bottom substrate. In some tests, the material was directly placed on the grounded steel substrate. The corona discharge voltage ranges from ±10 kV to ±40 kV. The current was set from 0 to 0.2 mA. The distance between the top and grounded substrate is adjustable from 1.27 cm to 16.51 cm. The distance between the discharge needle and the top substrate was set as 3.5 cm.

Growing CE-3D Structures Through Stacking

Figure 1A:
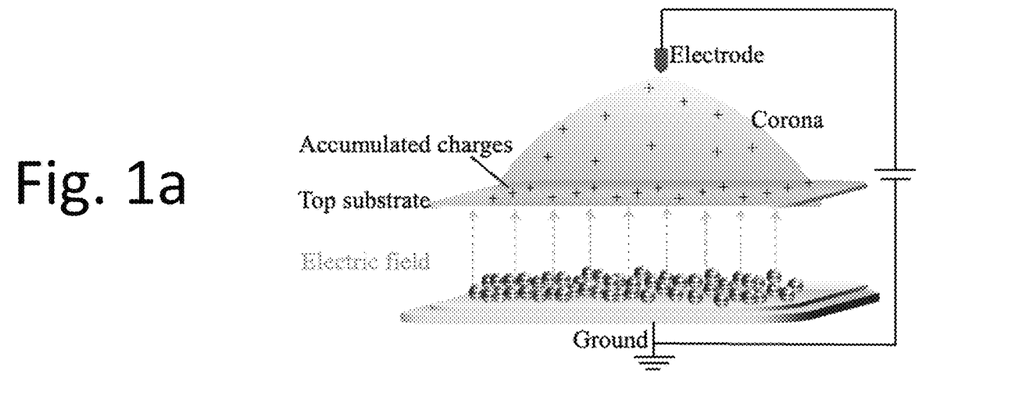
FIG. 1a is a schematic view of bamboo shoot growing CE-3DP behavior prior to the corona being activated.
Figure 1B:
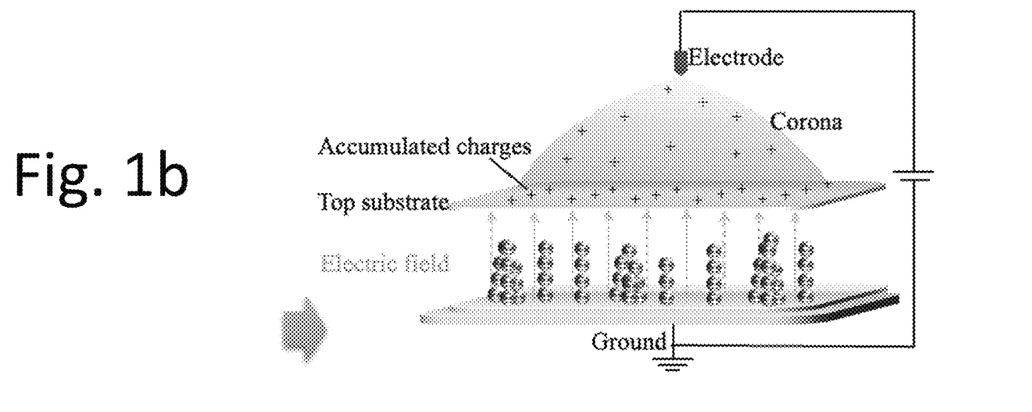
FIG. 1b is a schematic view of bamboo shoot in the middle of 3D structure growing.
Figure 1C:
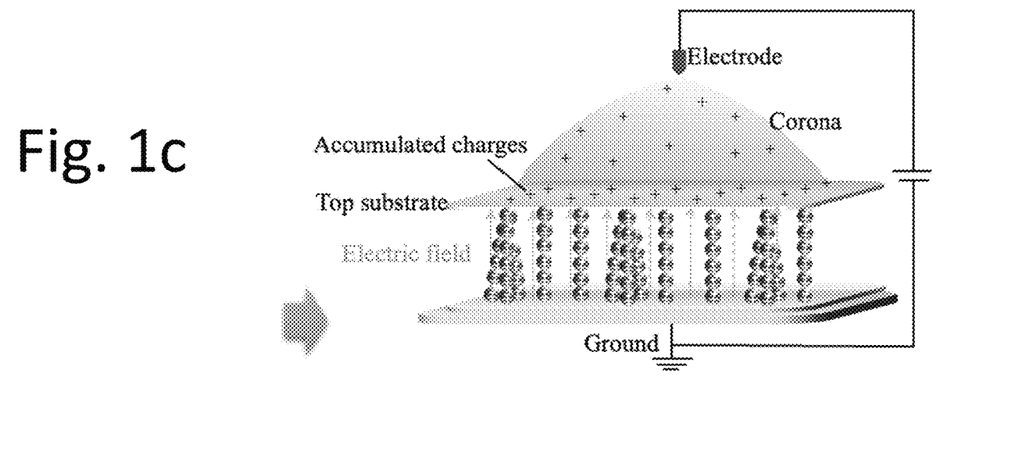
FIG. 1c is a schematic view of the 3D structure reaching top substrate.
Figure 2:
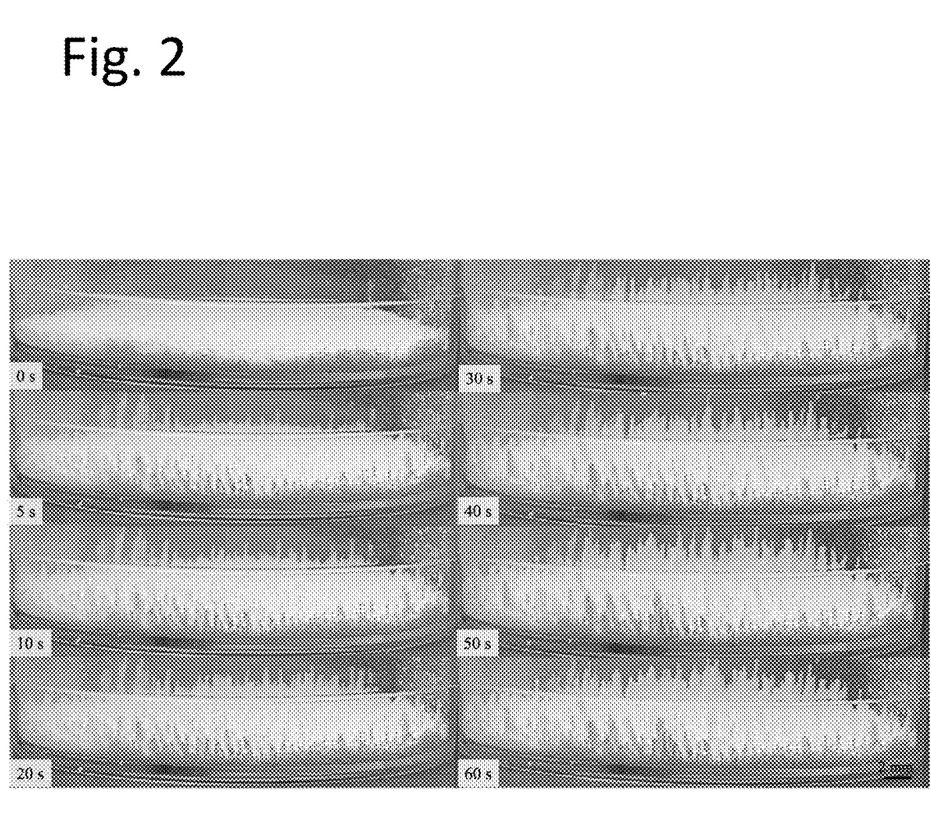
FIG. 2 is a series of time-denoted photographic images of the 3D structure growth of cellulose acetate (30 k MW) powders every 5 s within 1 minute.
Figure 3A:
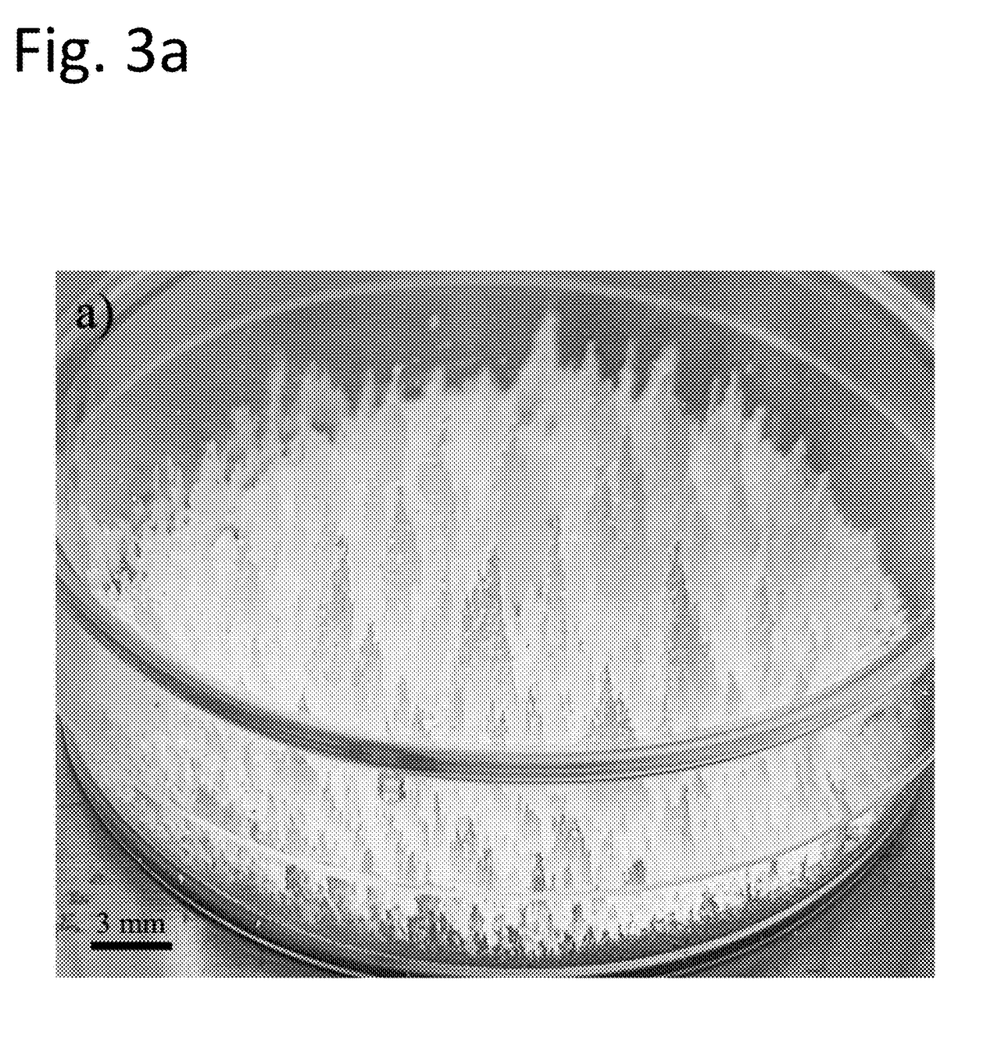
FIG. 3a is a photographic image of the CE-3DP CA (30 k MW) structure at after corona is turned on for 60 seconds.
Figure 3B:
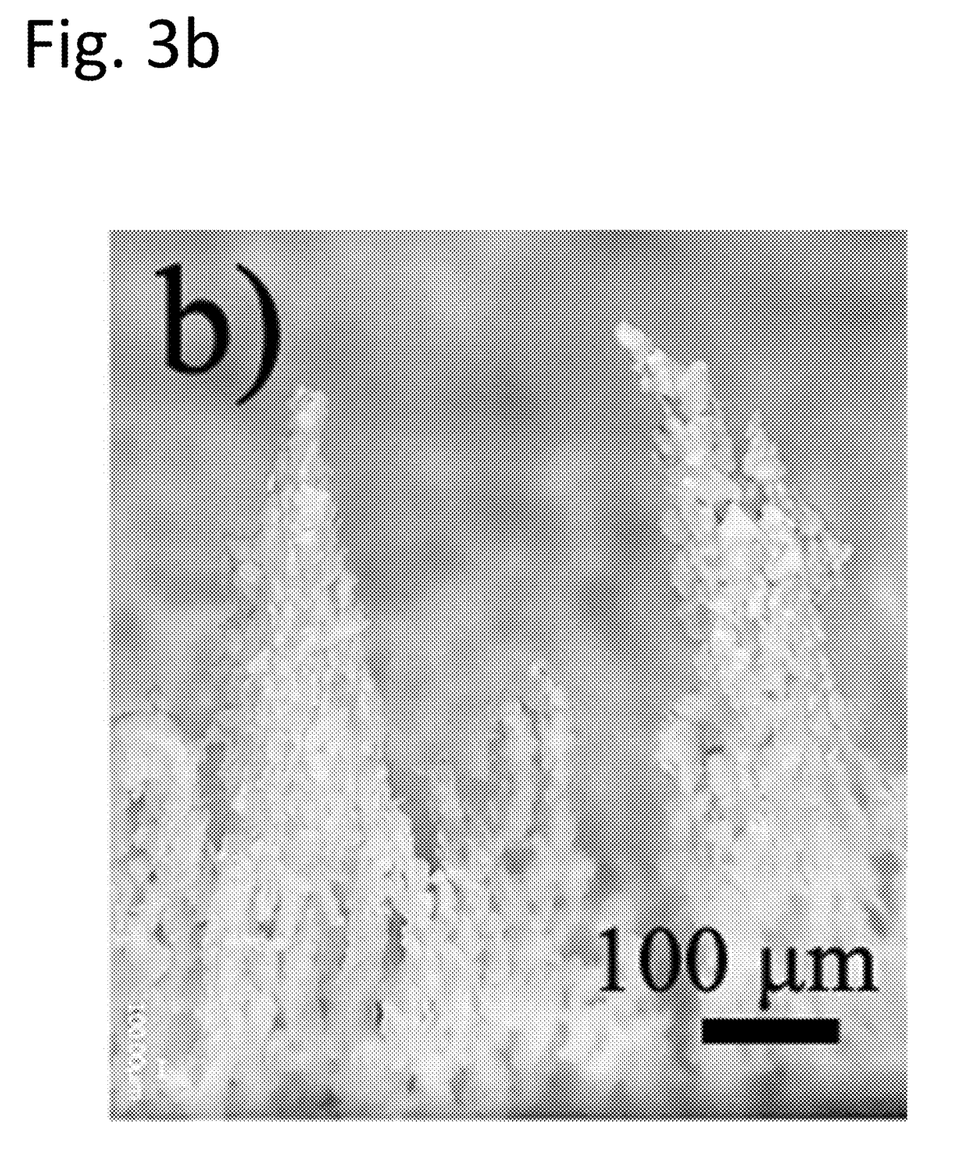
FIG. 3b is a photographic image of the side view of the cone shaped 3D structure.
Figure 3C:
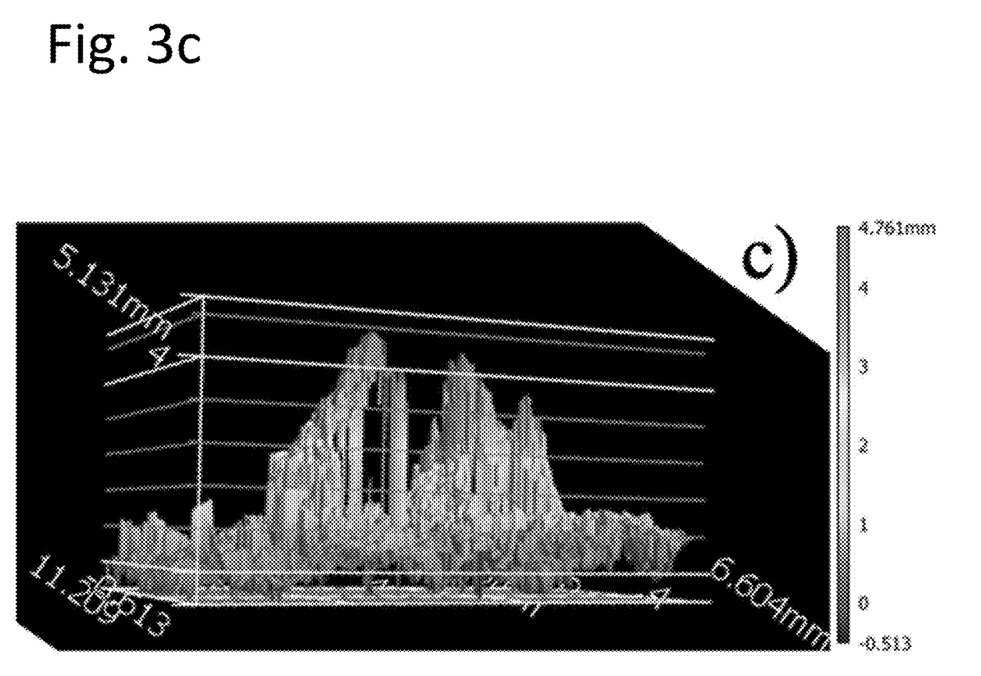
FIG. 3c is a computer-generated 3D structure mapping of the cone shape 3D structure.
Figure 3D:
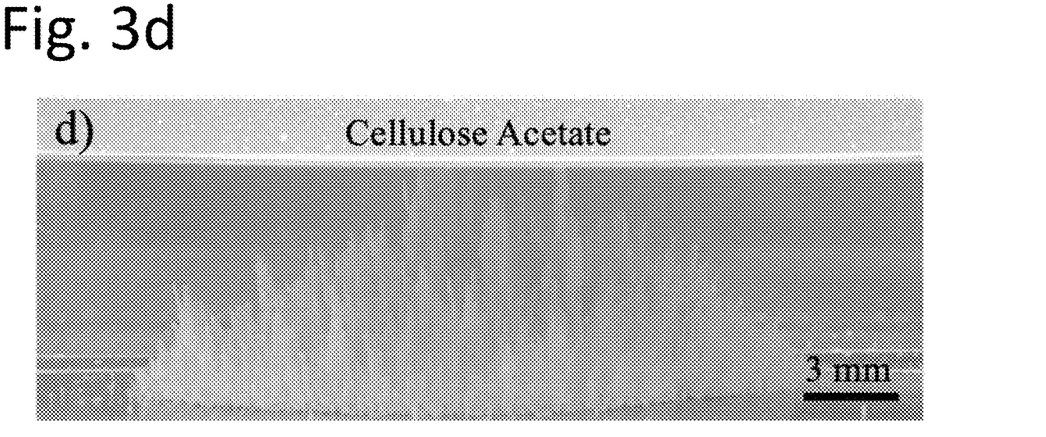
FIG. 3d is a photographic image of CA (50 k MW) after 60 s CE-3DP.

There are two types of major 3D structure construction behaviors observed in the CE-3DP process, one behaves similar as the growing of bamboo shoots, as schematized in FIG. 1a. The stacking of the structure forms within the pile of the binder-free powder and the growth is from bottom to top. The binder-free powders gradually stack into bamboo shoots like 3D structures within seconds. FIG. 2 is the group of pictures monitoring the CE-3DP bamboo shoot growing process of cellulose acetate (CA) polymer powders for one minute. It was observed that very small bamboo shoots appeared within the first second. At the 5th second, bamboo shoots higher than 4 mm have appeared, mostly along the walls of the PS container. With corona kept on for longer time, more and more "bamboo shoots" grow up, with more larger ones showed up in the central area. The density and height of the CE-3DP bamboo shoots increased faster during the first 30 s and slower after that. Video 1 captured the growing process of the bamboo shoot structures. The growth of the bamboo shoot structures is from bottom to top, and often, the growth of one bamboo shoots is in very quick steps, instead of continuously powder by powder. FIG. 1 shows schematics of bamboo shoot growing CE-3DP behavior: a) before corona is on; b) in the middle of 3D structure growing; and c) the 3D structure reaches top substrate. FIG. 2 shows monitoring the 3D structure growth of cellulose acetate (30 k MW) powders every 5 s within 1 min. FIG. 3a is a top view of the CE-3DP bamboo shoot structures. It can be observed that the powders are stacked in a bamboo shoot shape with the tip facing the top substrate and the growing direction along the electric field. FIG. 3b is the enlarged image of the side view of the bamboo shoot structures. The powders are well packed along the electric field direction, but there are small gaps along the direction perpendicular to the electric field. FIG. 3c is the 3D structure mapping of the bamboo shoot shape structures. The height of them is in the range of several millimeters to centimeters.

Figure 3E:
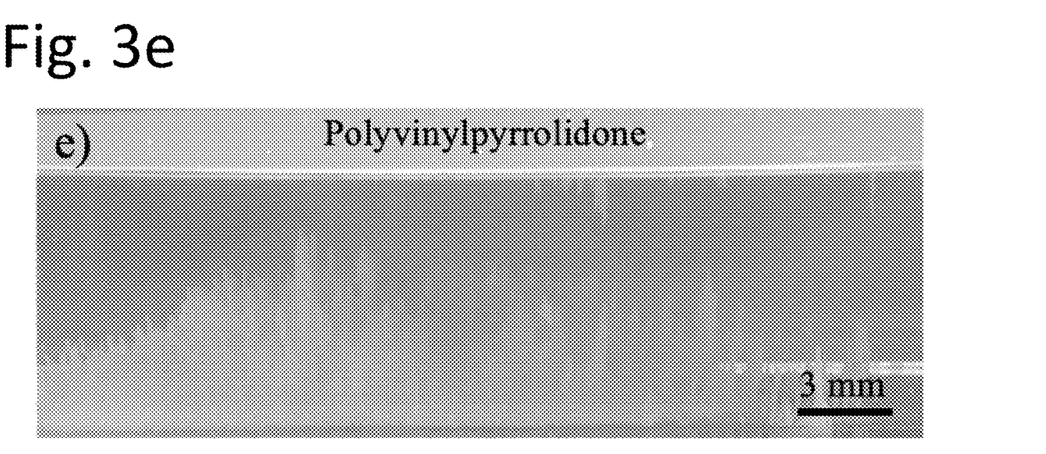
FIG. 3e is a photographic image of polyvinylpyrrolidone (PVP) powder after 60 s CE-3DP.
Figure 3F:
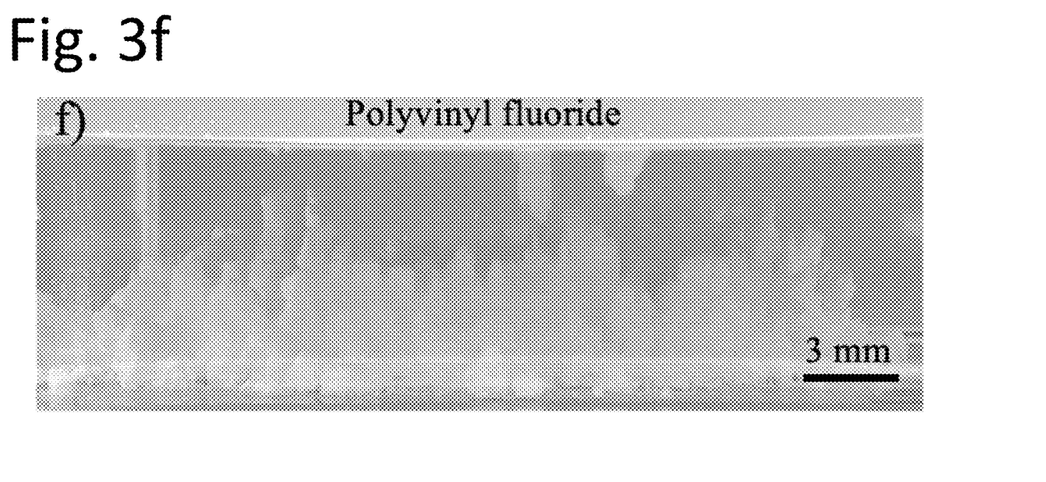
FIG. 3f is a photographic image of polyvinyl fluoride (PVF) powder after 60 s CE-3DP.

In addition to CA (FIGS. 2 and 3a-d), more polymer powders can be stacked into 3D structures with CEP technology, including polyvinylpyrrolidone (PVP) (FIG. 3e), polyvinyl fluoride (PVF) (FIG. 3f), ethylene vinyl acetate (EVA), polylactic acid (PLA), and poly (ethylene glycol) (PEG), and even glass beads or bubbles. It means that the corona enabled 3D structure construction behavior is applicable to many dielectric powders. Furthermore, the inventions compared the behavior of the same type of polymers with different molecular weight, no significant differences were observed. It means that the molecular weight of the polymers is not the key influence factor for the printing behavior. Instead, the electrical conductivity, the surface condition, the weight, or density of the powders impact the printing behavior more.

FIG. 3 shows CE-3DP printing behavior: a) top side view of the CE-3DP CA (30 k MW) structure at after corona is turned on for 60 s; b) the side view of the cone shape 3D structure; c) the 3D structure mapping of the cone shape 3D structure; d) CA (50 k MW) after 60 s CE-3DP; e) polyvinylpyrrolidone (PVP) powder after 60 s CE-3DP; and f) polyvinyl fluoride (PVF) powder after 60 s CE-3DP.

Figure 4A:
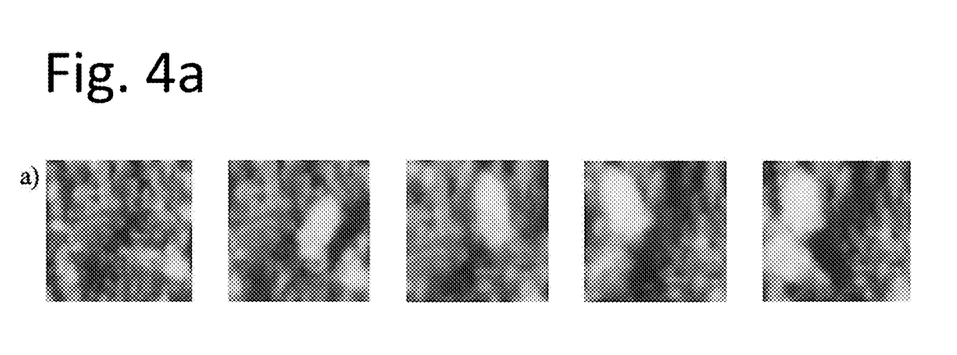
FIGS. 4a-b are photographic images obtained with a high-speed camera of the discovered stacking process.

A high-speed camera was utilized to capture the actual motion of this ultrafast growing process. FIG. 4a) shows an elliptical shape CA powder firstly stood up by turning its long axis perpendicular to the substrate. Then it traveled left to the powder close to it. As they got in contact, the particle on the left side twisted and adjusted its position to join the elliptical particle reaching it. Once the occlusion was completed, these two particles would stay together. More particles may join them if the electric force is enough.

Figure 4B:
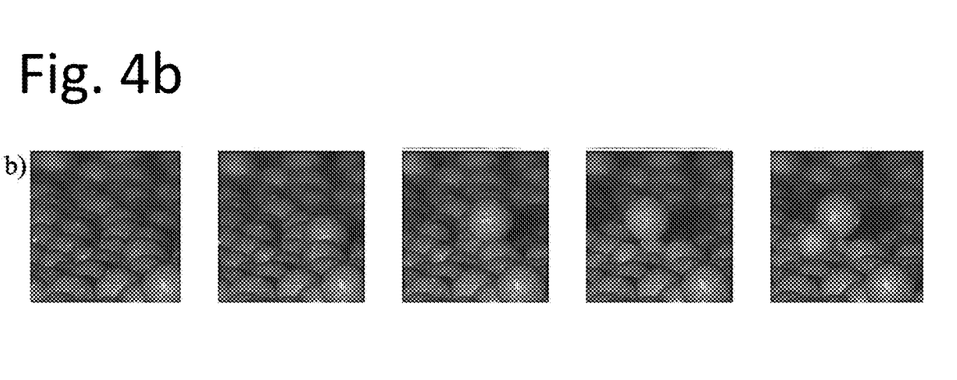

As elaborated in FIG. 4b, polystyrene (PS) spheres also went through the stacking process similar as CA powders. Firstly, two small sphere particles get closer with each other and finally stack together to form a dipole chain; then another particle was attracted to this chain, forming a larger stack. During this process, the relative position of the particles, especially the bottom ones may adjust. It seems like a process to adjust the positions of the powders and try to build up a path to minimize the overall electric field in the system. FIGS. 4a-b are the high-speed camera captured stacking process.

Figure 5A:
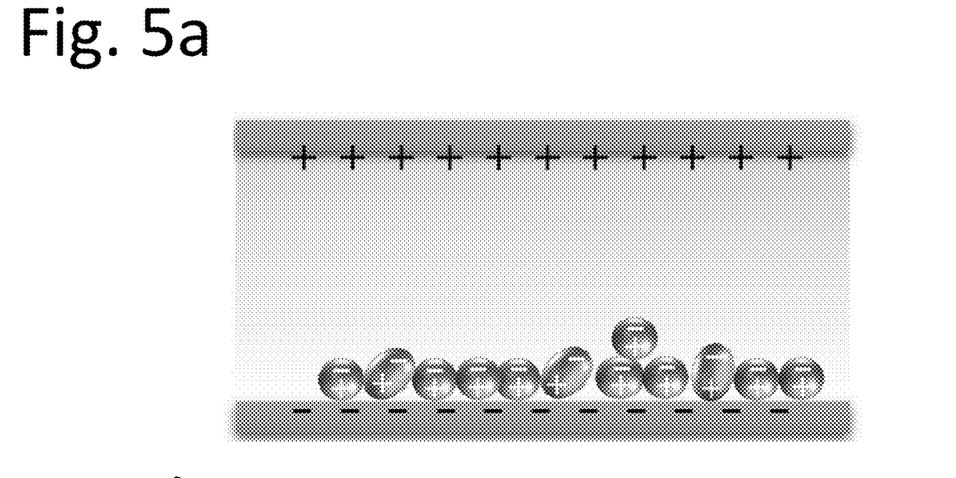
FIGS. 5a-c are conceptual illustrations of the discovered stacking mechanism.
Figure 5B:
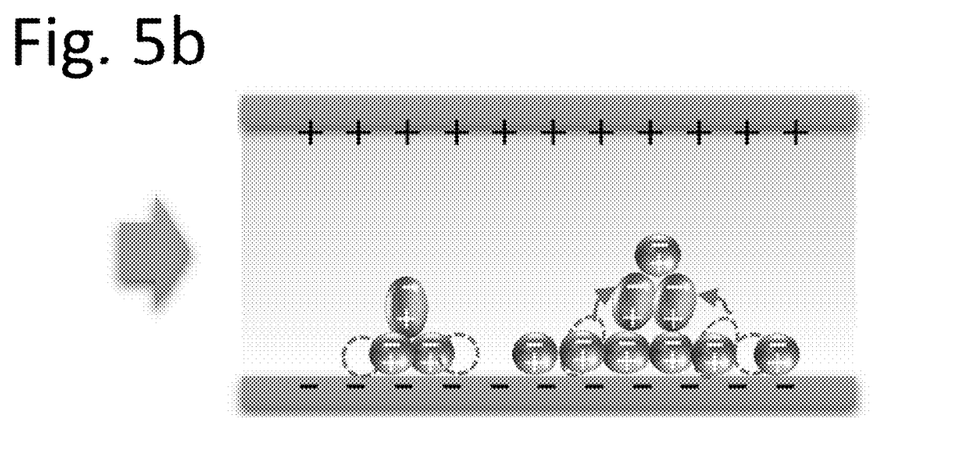
Figure 5C:
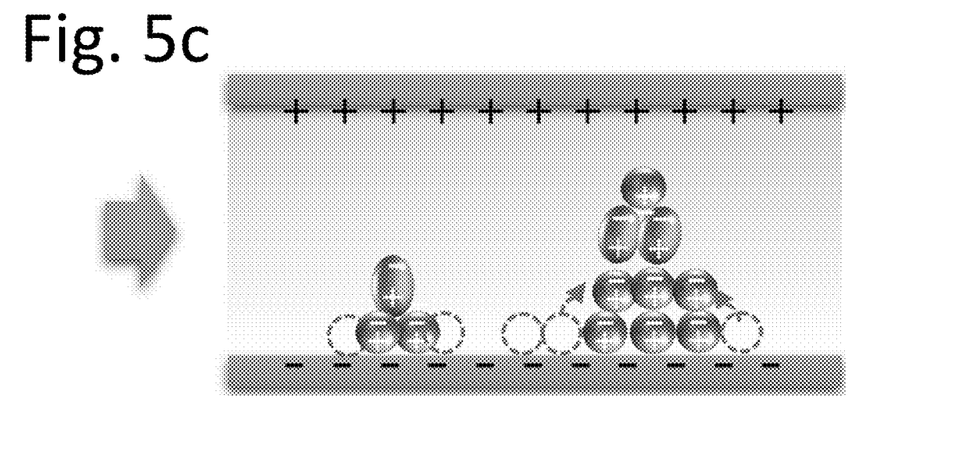

FIGS. 5a-c show schematics to demonstrate the mechanism of the CE caused bamboo shoot 3D structure growing process. The steps include: 1) the strong electric field polarizes the polymer powders; as the powders are not perfect ball shape, the polarization center of each powder is not perfectly aligned; the positive side of one powder may be very close to the negative side of its adjacent powder (FIG. 5a); 2) the strong electric field applies upward Coulomb force on the powder; 3) when the electric field induced Coulomb force overcomes the gravity and attraction force between adjacent powders, the powder can "climb" up along its adjacent powder, and start stacking (FIG. 5b); 4) the original pile of the powders play as the particle resource, with more particles obtain enough force, more particles can join the stacking, they increase the height of the bamboo shoot shape stack from bottom to up (FIG. 5c).

Figure 6A:
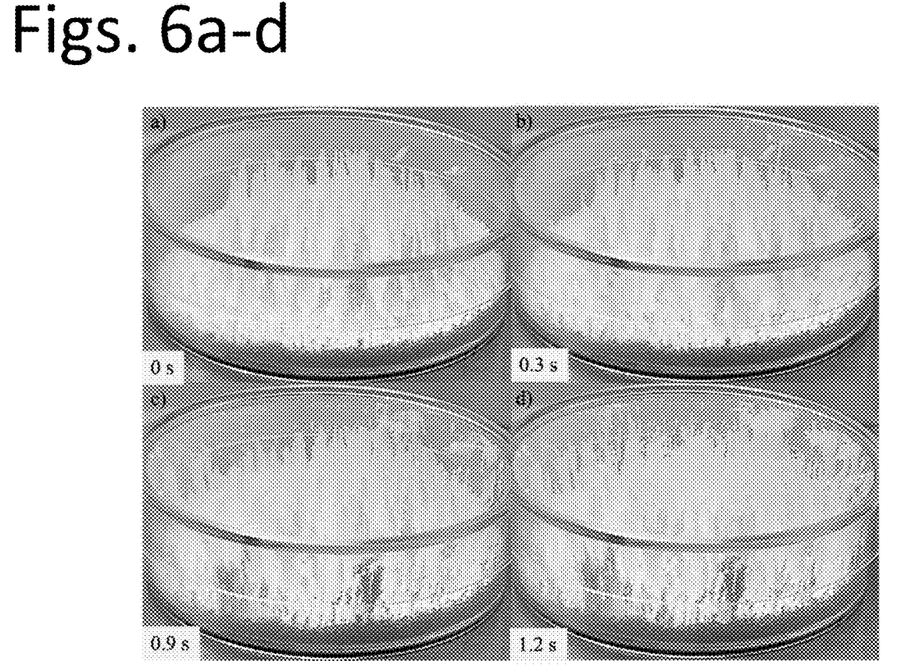
Figure 6E:
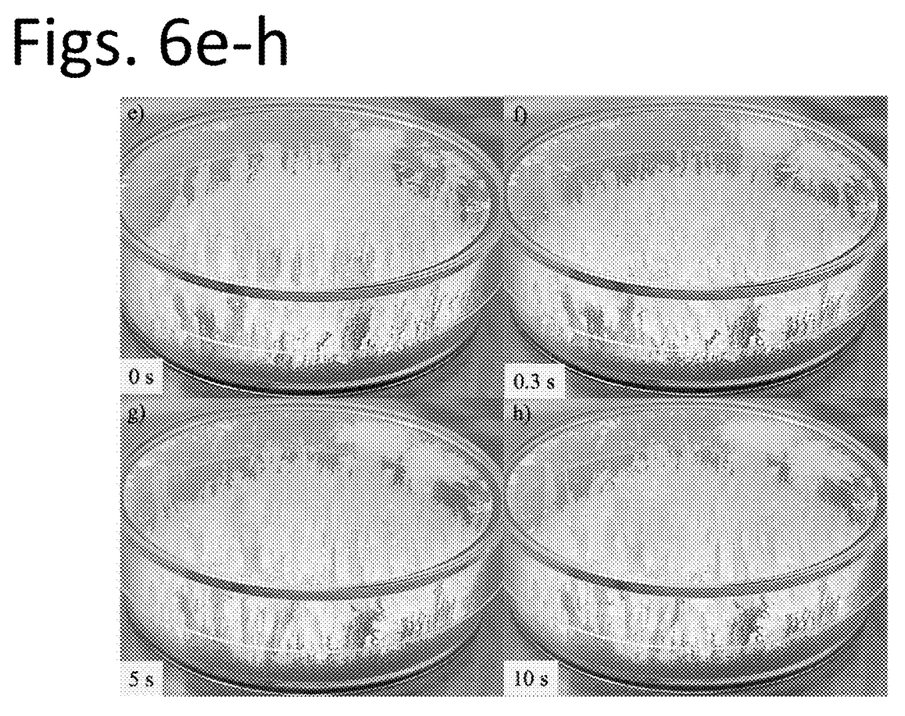

By changing the polarity of the corona discharge, the polarity of the powder and the shape of the stacking can be immediately changed. FIG. 6a was built with positive corona. Once the polarity was switched to negative, a small amount of the bamboo shoot shape 3D structures fell (FIG. 6b), flowed by a very quick spread-out process within 0.6 s (FIG. 6c). The new stacks become very thin as shown in FIG. 6d after 0.3 s. If the polarity of the corona was switched back, as shown in FIG. 6e-h, most of the thin 3D structures fell within 0.3 s (FIG. 6f). But after that, the thin 3D structure can be grown back within 5~10 s, forming a new thin 3D structure. From this experiment, it was discovered that both positive and negative corona discharge can form the stacked 3D structures; if change the polarity after the structure was formed, the structure may fall and form a new 3D structure with different shapes.

Growing CE-3D Structures with 2D/1D Materials

Figure 7A:
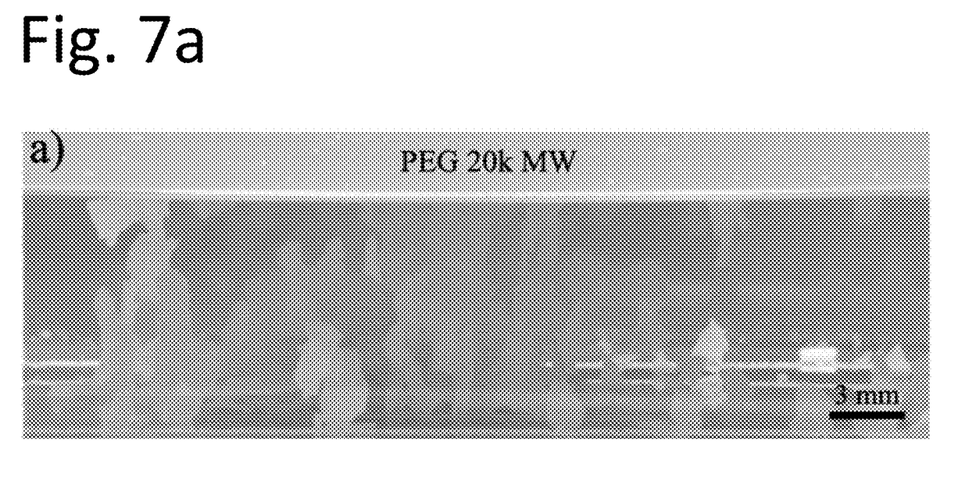
FIG. 7a is a photographic image of CEP effecting 2D and 1D material alignment for PEG pallets.
Figure 7B:
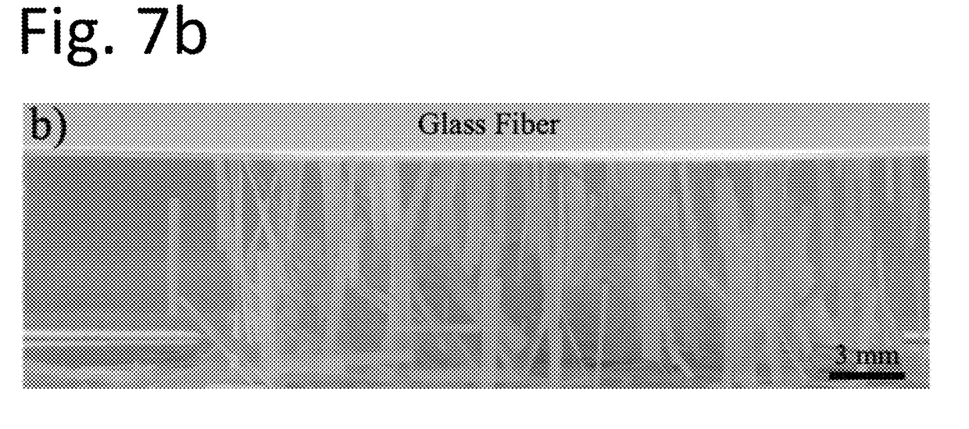
FIG. 7b is a photographic image of CEP effecting 2D and 1D material alignment for glass fibers with length of 5 mm.
Figure 7C:
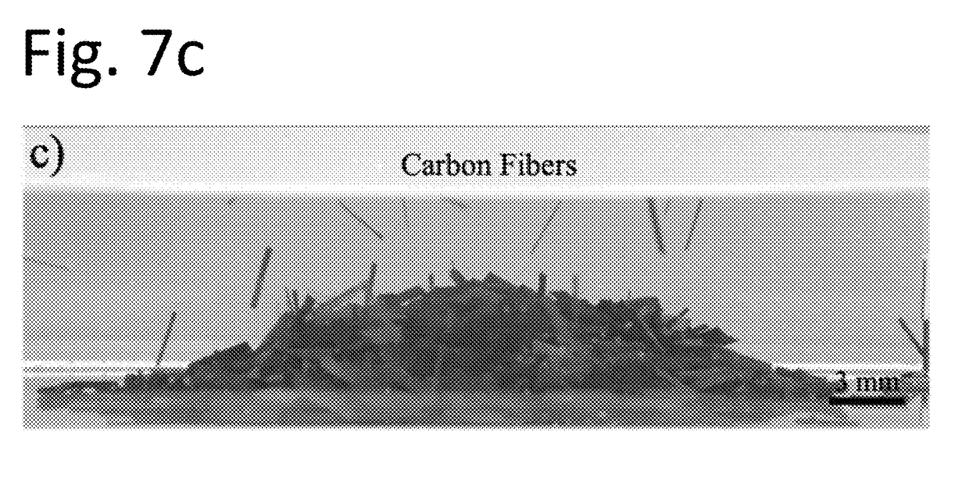
FIG. 7c is a photographic image of CEP effecting 2D and 1D material alignment for carbon fibers with length of 3 mm.

In addition to particles, CE process can also stack 2D (example in FIG. 7a, PEG pallets) and 1D (examples in FIGS. 7b and 7c of glass fibers and carbon fibers respectively) shape dielectric materials. The 2D/1D materials automatically align themselves with the electric field. As these dielectric materials are more conductive than air, they are tending to create better electric paths through their alignment and stacking. Plus, when the electric field is strong enough or the material is light enough, instead of direct stacking, some of the material can be attracted to the top substrate. This phenomenon can be utilized to create aligned structures and composites.

Figure 8:
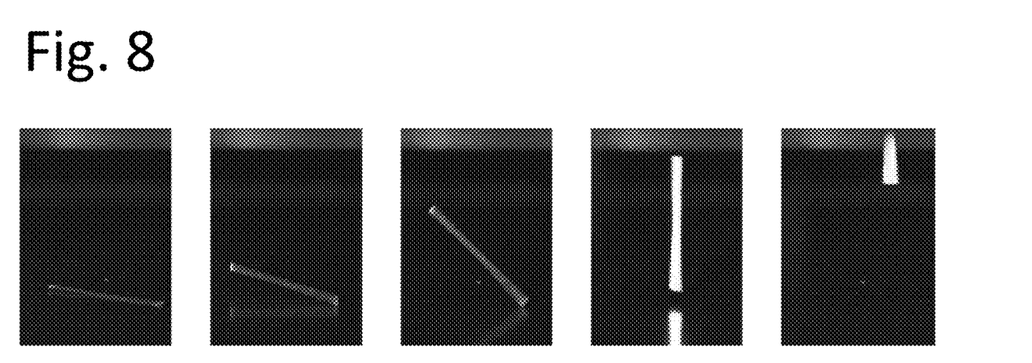
FIG. 8 is a series of photographic images obtained by a high-speed camera monitoring movement of the 3 mm-long carbon fiber during the CE-3DP process.

In FIG. 8, we use high speed camera to monitor the behavior of the carbon fiber during the CE process. Once the corona was turned on, the fiber was polarized. It firstly rotated to the direction with the width direction perpendicular to the substrate. As the width of the fiber is not totally uniform, one side of the fiber was lifted by the electric force, forming an angle between the surface of the substrate. Then the fiber entirely stood up, with the length direction aligned with the electric field direction. Finally, as this fiber is light enough, it can overcome the attraction force from the bottom substrate and its own gravity. It moves towards the top substrate along with the electric field direction by the electric force.

Growing CE-3D Structures Through Bridging

Figure 9A:
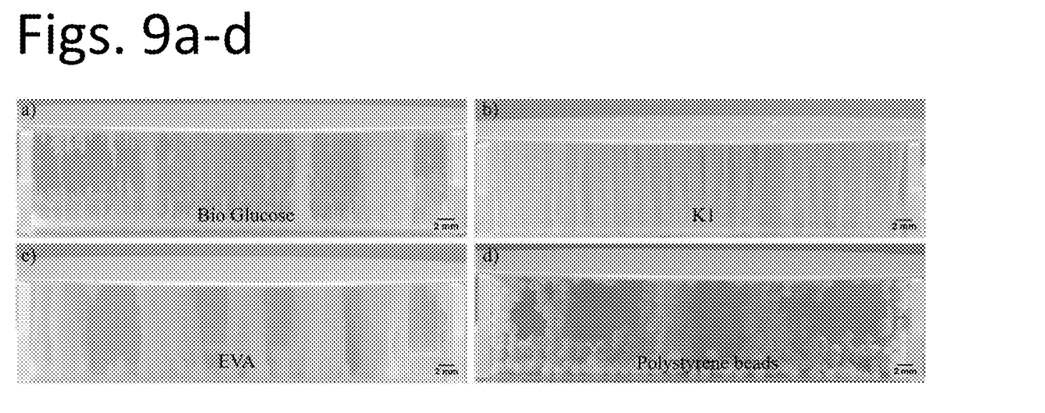
FIG. 9a is a photographic image of the CE-3DP bridging process to form 3D structures with bio glucose.
Figure 9E:
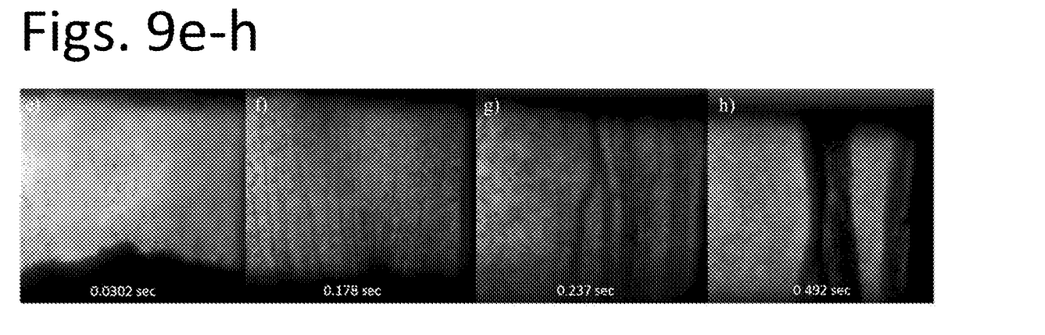
Figure 9I:
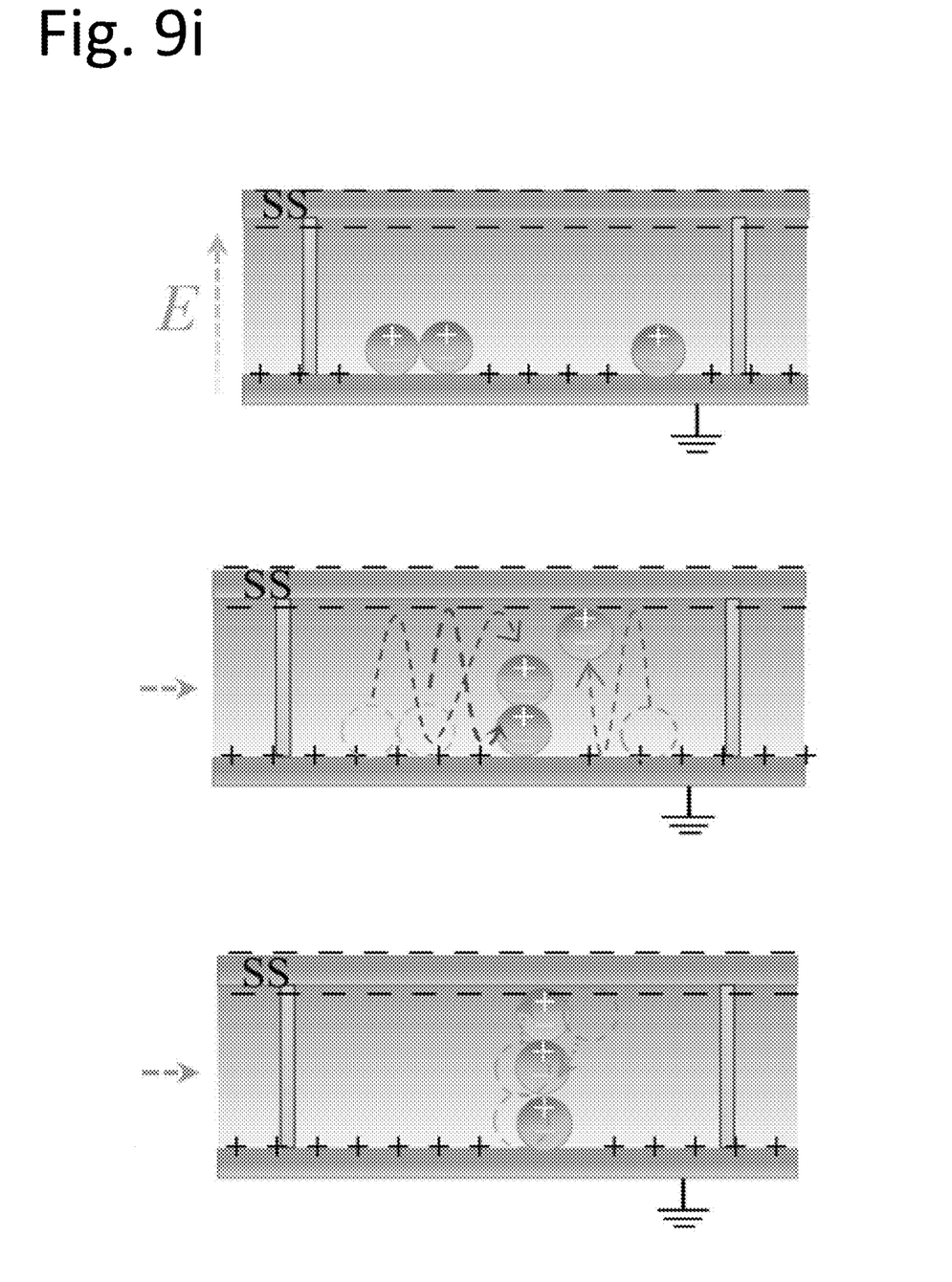
FIG. 9i are schematics of the CEP 3D bridging process.

Not all dielectric materials follow the growing behavior discussed above, especially when the material particles are small and light. FIG. 9 lists several examples of materials (including glucose in FIG. 9a, K1 glass beads with diameter of 65 μm in FIG. 9b, ethylene vinyl acetate (EVA) copolymer powders in FIG. 9c, and polystyrene beads in FIG. 9d) which do not form the 3D structure by growing from bottom to up. Instead, they fly to the top substrate firstly. And the particles bunce back and force between the top and bottom substrates. The growing starts from both the top and bottom side. When the grown structure from the top and from the bottom attaches with each other, they bridge the top and bottom substrate, forming a more conductive path than air. Thus, we call this behavior "bridging" process. From the high-speed camera results on the 65 μm glass beads in FIG. 9e~h, we learnt that the process can be extremely fast. The bridges can be formed in less than 0.2 s. Most particles jump between the top and bottom substrate continuously, until they find the spot with the largest electric field to hold it, which in most situations are the most protruded area formed by previous stacks. FIG. 9i is the schematics of the CEP 3D bridging process, starting from the sandstorm like particle jumping between two substrates, followed by the formation of small stacks simultaneously from both the bottom and top substrates, and finalized by bridging both substrates. This bridging process is another efficient way to form 3D structures by taking advantage of the binder-free CE-3DP process.

Controlling and Patterning CE-3DP Structure Construction

The material conductivity, shape, size, density, and surface condition, as well as corona discharge voltage, top and bottom substrate conductivity, top-bottom substrate distance, needle-top substrate distance can all impact the CE-3DP behavior. It was learnt that smaller or lighter particles, higher corona voltage, smaller top-bottom substrate distance or needle-top substrate distance can lead to faster 3D structure construction.

Figure 10A:
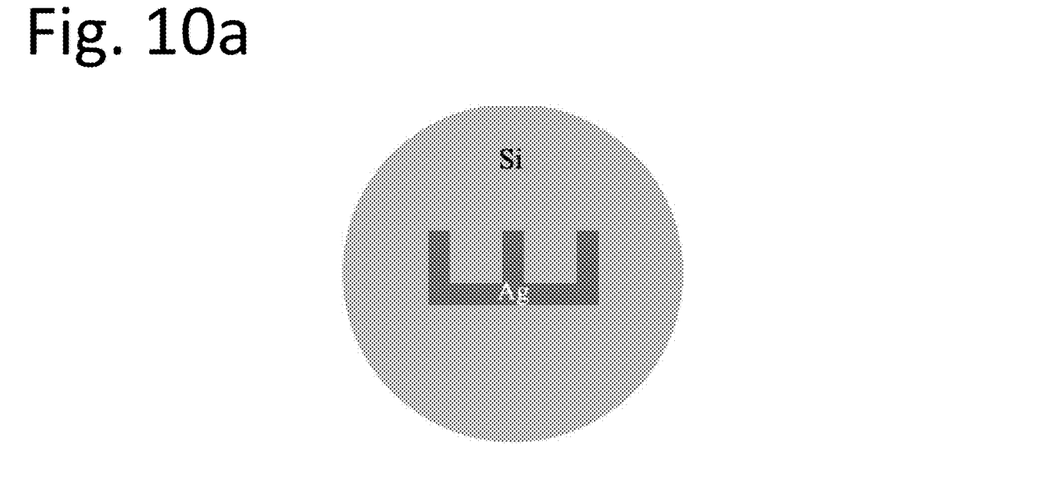
FIG. 10a is a schematic rendering showing controlling the CE-3D structure through patterning the top substrate with a silicon (Si) substrate with a silver (Ag) pattern.
Figure 10B:
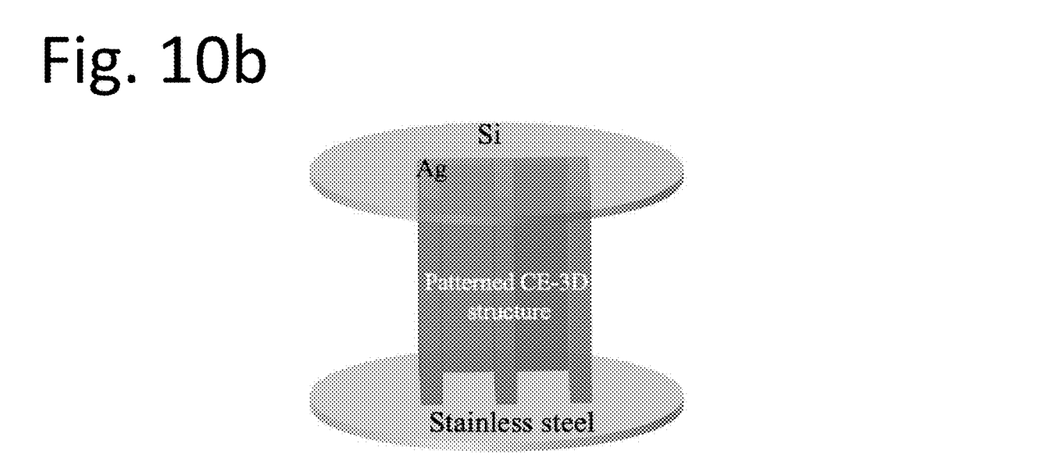
FIG. 10b is a schematic the expected distribution of the CE-3D structure.
Figure 10C:
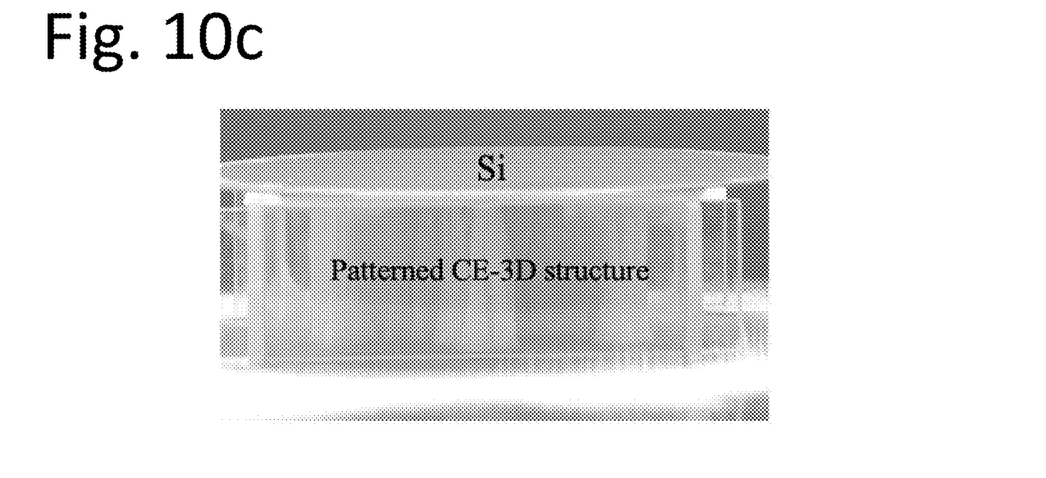

For instance, the conductivity of the top and bottom substrate can influence the distribution of the electric field, ending up with impacting the distribution of the CE-3D structures. FIG. 10 is an example of patterning the top substrate to guide the construction of the CE-3D structure. Based on our simulation, the area with higher conductivity in the top substrate can form higher electric field. Therefore, in FIGS. 10a and 10b, when part of top substrate made by Si was coated with Ag, the area under the Ag pattern can obtain larger electric field. It tends to attract more glass beads towards this area. Finally, the patterned CE-3D structure can be formed through the bridging process along the area under the Ag pattern (FIG. 10c). Therefore, it is possible to control the shape, size and area of the CE-3D structure by patterning the top or bottom substrates.

Solidification of CE-3D Structures and their Functionalization

As dielectric materials are less conductive, the polarization effect can last and hold the 3D structure after the corona has been turned off. But external force or electric field can still break the structure. There are many ways to solidify and utilize the CE created 3D structures. For polymers, some of them can be melted or sintered by heating up through methods such as high temperature oven, infrared, laser, microwave, and others. For glasses or other materials which are difficult to melt, they can be attached together by adhesives. The adhesives can be coated on the surface of the particles before CEP or added to the 3D structures after CE-3DP.

Figure 11:
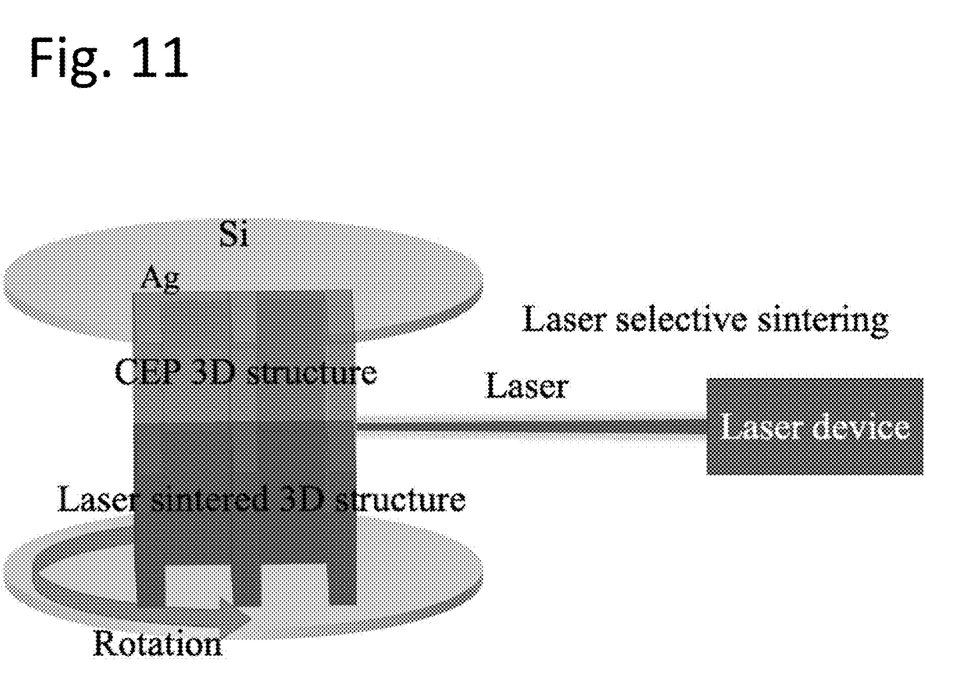
FIG. 11 is a schematic view of the CE-3DP process creating 3D structure in one-step followed by laser selective sintering process.

The solidified area can be selected, instead of solidifying the entire structure. FIG. 11 is the schematic of solidifying the CE-3D structure by using selective laser sintering (SLS) method. The system is formed by two parts, including the patterned CE-3DP system and the laser system. The stage of the CE-3D structure (i.e., the grounded electrode in the corona system) can rotate at controllable speeds. Once the corona is turned on, the CE-3D structure can be built up within seconds. Once it is ready, the laser can be turned on to selectively sinter the pre-designed area. Compared with conventional which must repeat the layer-by-layer process of solidifying the previous layer, adding a new layer, then solidifying the next layer, the CE-3DP process can pre-grow the 3D structure in one step. The laser can continuously and selectively scan the pre-grown structure to form the pre-designed 3D structure in a much higher efficiency.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for creating a three-dimensional structure from a binder-free powder, comprising the steps of:
   providing a plasma generator that forms a controllable electric field;
   positioning the binder-free powder within the influence of the electric field generated by the plasma generator; and
   activating the plasma generator to attract the binder-free powder into a three-dimensional structure wherein the plasma generator comprises a grounded bottom substrate and a top substrate elevated above the bottom substrate in substantially parallel planar orientation, the binder-free powder is placed in an interstitial space between the bottom substrate and the top substrate and an electrode above the top substrate and in electrical communication with the bottom substrate, the electrode coupled to a voltage power supply creates the electrical field, whereby the resulting three-dimensional structure is formed.

2. The method of claim 1 wherein the voltage of the plasma generator is between ±100 V to ±60 kV.

3. The method of claim 1 wherein the distance between the top substrate and the bottom substrate is adjustable from 4 nm to 30 cm.

4. The method of claim 1 wherein the binder-free powder is selected from the group consisting of cellulose acetate (CA), polyvinylpyrrolidone (PVP), polyvinyl fluoride (PVF), ethylene vinyl acetate (EVA), polylactic acid (PLA), and poly (ethylene glycol) (PEG), carbon fibers, polystyrene (PS), glucose, glass beads, and glass bubbles.

5. The method of claim 1 where the top substrate or bottom substrate is patterned with at least two distinct materials of different conductivity whereby it is possible to control the shape, size, and area of the structure by patterning the top or bottom substrates.

6. The method of claim 5 wherein the top substrate is formed of a material that includes silicon and the pattern is formed on the top substrate is a material that includes silver.

7. The method of claim 1 further comprising the step of solidifying a portion or all of the structure by a heat source or by ultraviolet (UV) emitter.

8. The method of claim 1 further comprising the step of solidifying a portion or all the structure by adhesive.

9. The method of claim 8 wherein the adhesive is coated onto the surface of the binder-free powder prior to activating the plasma generator.

10. The method of claim 1 wherein the bottom substrate is controllably rotated during activation of the plasma generator.

11. An apparatus for creating a three-dimensional structure from a binder-free powder, the apparatus comprising:
   a plasma generator that forms a controllable electric field within a container that receives binder-free powder;
   the container having a grounded conductive bottom element and a conductive top element elevated above the bottom element, whereby the binder-free powder is placed in an interstitial space between the bottom element and the top element and an electrode of the plasma generator is positioned above the top element and in electrical communication with the bottom element, the electrode coupled to a voltage power supply creates the controllable electrical field;
   a voltage control to adjust the voltage of the plasma generator between ±100 V to ±60 kV; and
   a control for activating the plasma generator to attract the binder-free powder into a three-dimensional structure whereby the resulting three-dimensional structure is formed.

12. The apparatus of claim 11 wherein the distance between the top element and the bottom element is adjustable from 10 nm to 30 cm.

13. The apparatus of claim 11 wherein the top element or bottom element is patterned with at least two distinct materials of different conductivity whereby it is possible to control the shape, size, and area of the structure by patterning the top or bottom elements.

14. The apparatus of claim 11 wherein the top element is formed of a material that includes silicon and the pattern is formed on the top element is a material that includes silver.

15. The apparatus of claim 11 wherein the bottom element is controllably rotated during activation of the plasma generator.

16. The apparatus of claim 11 further comprising a solidifying source selected from the group consisting of ovens, infrared emitters, lasers, UV emitters and microwaves.

17. The apparatus of claim 11 further comprising a solidifying laser and control system to selectively sinter the structure as it is formed.

18. An apparatus for creating a three-dimensional structure from a binder-free powder, the apparatus comprising:
   a plasma generator that forms a controllable electric field within a container that receives binder-free powder;
   the container having a grounded conductive bottom element and a conductive top element elevated above the bottom element, whereby the binder-free powder is placed in an interstitial space between the bottom element and the top element and an electrode of the plasma generator is positioned above the top element and in electrical communication with the bottom element, the electrode coupled to a voltage power supply creates the controllable electrical field;
   wherein the distance between the top element and the bottom element is adjustable from 10 nm to 30 cm; and
   a control for activating the plasma generator to attract the binder-free powder into a three-dimensional structure whereby the resulting three-dimensional structure is formed.

* * * * *